(12) United States Patent  (10) Patent No.: US 7,934,680 B2
Smith  (45) Date of Patent: May 3, 2011

(54) APPARATUS AND METHOD FOR BLENDING FLUIDS

(75) Inventor: Richard L. Smith, Overland Park, KS (US)

(73) Assignee: Global Ground Support, LLC, Olathe, KS (US)

( * ) Notice: Subject to any disclaimer, the term of this patent is extended or adjusted under 35 U.S.C. 154(b) by 1016 days.

(21) Appl. No.: 11/751,307

(22) Filed: May 21, 2007

(65) Prior Publication Data

US 2009/0294551 A1   Dec. 3, 2009

(51) Int. Cl.
B64D 15/10   (2006.01)
(52) U.S. Cl. ............................ 244/134 C; 137/79
(58) Field of Classification Search ............... 244/134 R, 244/134 C; 141/100, 104; 137/79
See application file for complete search history.

(56) References Cited

U.S. PATENT DOCUMENTS

| | | |
|---|---|---|
| 3,322,350 A | 5/1967 | Heinicke et al. |
| 4,191,348 A | 3/1980 | Holwerda |
| 4,333,607 A | 6/1982 | Mueller et al. |
| 4,573,802 A | 3/1986 | Kerrigan et al. |
| 4,723,733 A | 2/1988 | McClinchy |
| 4,826,107 A | 5/1989 | Thornton-Trump |
| 4,842,005 A | 6/1989 | Hope et al. |
| 4,872,501 A | 10/1989 | Hightower |
| 4,986,497 A | 1/1991 | Susko |
| 5,028,017 A | 7/1991 | Simmons et al. |
| 5,096,145 A | 3/1992 | Phillips et al. |
| 5,282,590 A * | 2/1994 | Zwick ........................ 244/134 C |
| 5,454,532 A | 10/1995 | Whitmire |
| 5,845,848 A | 12/1998 | Amako et al. |
| 6,766,836 B2 * | 7/2004 | Kneringer et al. ............ 141/100 |
| 6,820,841 B2 | 11/2004 | Mittereder et al. |
| 7,089,972 B2 | 8/2006 | Kneringer et al. |
| 7,129,846 B2 | 10/2006 | Rasmussen et al. |
| 2003/0042365 A1 | 3/2003 | Mittereder et al. |

FOREIGN PATENT DOCUMENTS

| | | |
|---|---|---|
| EP | 0555002 | 8/1993 |
| EP | 1775218 | 4/2007 |

OTHER PUBLICATIONS

International Search Report and Written Opinion dated Feb. 9, 2010.

* cited by examiner

*Primary Examiner* — Galen Barefoot
(74) *Attorney, Agent, or Firm* — Summa, Additon & Ashe, P.A.

(57) ABSTRACT

An apparatus and method for blending fluids and applying the blended fluid to a surface of an aircraft during deicing and anti-icing operations having a first tank, second tank, blend tank, pumps, conduits, heaters, controllers, and a delivery device. In operation, a controller compares the composition of the blended fluid in the blend tank to the composition of a target fluid that is determined by current ambient temperature of the environment, and advances first and second fluids from the first and second tanks, respectively, into the blend tank to achieve and maintain the target fluid composition in the blend tank.

55 Claims, 11 Drawing Sheets

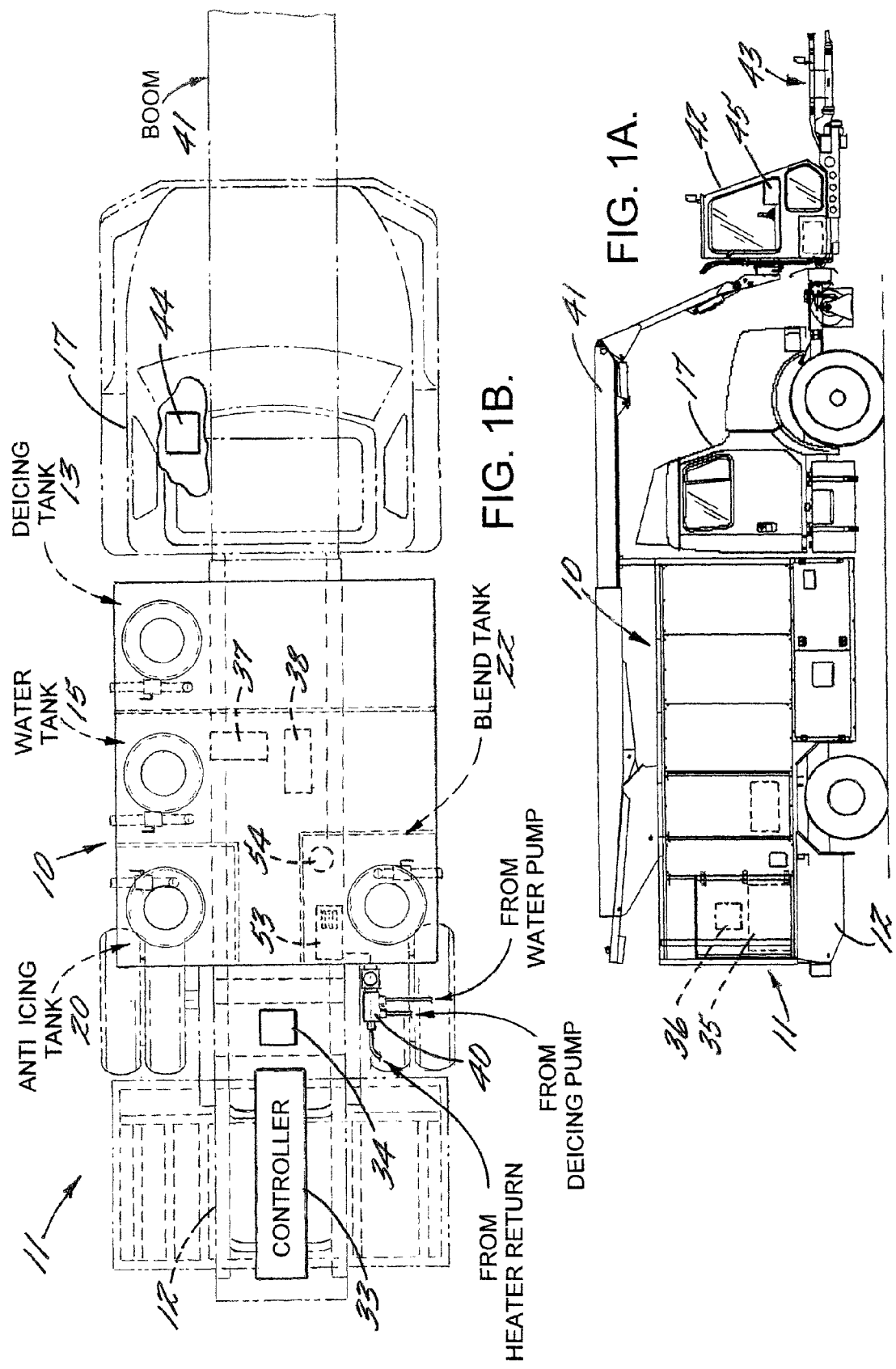

APPARATUS AND METHOD FOR BLENDING FLUIDS

FIELD OF THE INVENTION

The invention relates to equipment for blending fluids and applying the blended fluid to a surface. Specifically, the invention relates to an apparatus for creating a blend of deicing fluid and water to create a deicing solution for use on aircraft or other vehicles, wherein the composition of the blended solution is tailored to current weather conditions. The invention further relates to a method for applying the blended fluid to an aircraft.

BACKGROUND

In freezing conditions, there exists a danger that ice may form on the surfaces of an aircraft. Because the principle of flight with respect to modern aircraft is based on the smooth flow of air over the surfaces of the aircraft to generate lift, any ice that accumulates on the surface can degrade the aircraft's ability to fly by effectively roughening these surfaces. Additionally, large pieces of ice that become dislodged from the surface can potentially damage propellers or turbine engines. Further, thick ice can prevent the operation of the aircraft's controls (e.g., flaps and rudder). Accordingly, the ice must be removed from the aircraft, and prevented from forming thereon, in order for the aircraft to operate safely and achieve optimal performance.

A known method for removing ice from the surfaces of an aircraft includes the application of a deicing fluid that lowers the freezing point of water in order to melt any ice accumulated on the aircraft's surfaces or to prevent the formation of ice in the first place. Various glycol compositions (e.g., ethylene glycol, propylene glycol) are commonly used as deicing fluids. Glycol compositions are capable of lowering the freezing point of water to approximately $-60°$ C. (i.e., $-76°$ F.). Although this change in the freezing point would effectively melt any ice or prevent ice from forming, the use of pure glycol compositions in this way is excessive on all but the coldest of days and leads to waste of the glycol.

As a result, many airlines dilute the glycol compositions with water to reduce the amount of de-icing fluid used. For instance, a 1:1 blend of glycol-based deicing fluid and water (i.e., 50/50 blend) is common and capable of lowering the freezing point of water to approximately $-38°$ C. (i.e., about $-37°$ F.). Thus, even with the glycol diluted in this fashion, an excessive amount of glycol may still be consumed. Unfortunately, airline operators cannot simply use a weaker blend of glycol and water (e.g., a 20% glycol solution with a freezing point of about $-8°$ C.) because weather conditions—and specifically the ambient temperature of the environment—may prevent the diluted blend from sufficiently lowering the freezing point of the water.

Accordingly, there exists a need for a system for creating a custom blend of deicing fluid and water based on the weather conditions existing at the time the deicing solution is to be applied. Ideally, such a system would provide the options of relying upon a controller to automatically determine a target fluid composition or permitting an operator to define the target fluid composition. Such a system would ensure that the deicing solution could effectively remove the ice from the surface of the aircraft and/or prevent the formation of ice on the aircraft without using unnecessarily high concentrations of deicing fluid.

A need further exists for a mobile deicing system that mixes de-icing fluid and water to a defined ratio, assesses the composition and temperature of the mixture, adjusts the composition and temperature depending upon weather conditions, and then applies the mixture to the surface.

SUMMARY OF THE INVENTION

The invention is an apparatus for blending fluids and applying the blended fluid to a surface of an aircraft. The apparatus may be mounted on a vehicle for use during mobile operations. The apparatus comprises a first tank containing a first fluid, a second tank containing a second fluid, a blend tank containing a blended fluid formed from the first and second fluids, and a third tank containing a third fluid. In one embodiment, the first fluid is a deicing fluid, the second fluid is water, and the third fluid is anti-icing fluid.

The invention further provides a fluid analyzer that identifies the composition of the blended fluid, a temperature sensor that identifies the ambient temperature of the environment, and a first analyzer in communication with the temperature sensor, wherein the first analyzer determines the composition of the target fluid. The fluid analyzer generates a signal representative of the composition of the blended fluid and the first analyzer generates a signal representative of the composition of the target fluid. In operation, the first analyzer determines the composition of the target fluid based upon the ambient temperature of the environment as provided by the first temperature sensor. The target fluid includes a blend of water and deicing fluid sufficient to deice, for example, the wing surface of an aircraft, under current weather conditions (e.g., ambient temperature).

The apparatus also includes a first controller that is operatively responsive to the signal representative of the composition of the blended fluid, and the signal representative of the composition of the target fluid. During operation, the controller compares the composition of the blended fluid to the composition of the target fluid and advances the first and second fluids from the first and second tanks, respectively, into the blend tank to achieve and maintain the target fluid composition in the blend tank.

A heater is provided to heat the blended fluid prior to application to an aircraft. A delivery device is supplied for applying the blended fluid to the surface of an aircraft. In one embodiment, the delivery device is an extendible boom having an enclosed cab secured at one end thereto, wherein the boom and enclosed cab support at least one nozzle for applying the blended fluid to the surface of an aircraft.

With respect to fluid flow, the first and second tanks are in fluid communication with the blend tank, and the blend tank is in fluid communication with the heater and the delivery device. Further, the third tank is in fluid communication with the delivery device. Accordingly, the delivery device is configured to apply heated blended fluid as well as anti-icing fluid to the surface of an aircraft.

The apparatus further provides a mixing manifold that provides fluid communication between the first tank, second tank, blend tank, and first heater. One or more pumps provide fluid communication between the first tank and the blend tank, the second tank and the blend tank, the blend tank and the heater, and the third tank and the delivery device.

The invention also provides a method for applying a blended fluid to an aircraft. Initially, the temperature sensor relays the ambient temperature of the environment to the first analyzer, and the first analyzer determines the composition of the target fluid based upon the ambient temperature. In other words, the method includes the step of defining the composition of a target fluid. The step of defining the composition of the target fluid entails measuring the ambient temperature and then determining the composition of a fluid required to deice an aircraft based upon the measured ambient temperature. The composition of the target fluid may be automatically determined by the first analyzer or manually set by an operator.

The next step of the inventive method includes mixing the first fluid from the first tank and the second fluid from the second tank in the blend tank to form a blended fluid. Upon mixing, the method includes the step of measuring the composition and temperature of the blended fluid. In one embodiment, the method incorporates a refractometer to measure the composition of the blended fluid and a temperature sensor to measure the temperature of the blended fluid.

Thereafter, the method includes the steps of manipulating the blended fluid to create a processed blended fluid having a composition substantially equivalent to the composition of the target fluid, and then applying the processed blended fluid to an aircraft.

Prior to the step of manipulating the blended fluid, the method provides the step of comparing the measured composition of the blended fluid to the composition of the target fluid to determine whether the composition of the blended fluid is substantially equivalent to the composition of the target fluid.

Next, the step of manipulating the blended fluid includes adjusting the composition of the blended fluid by incorporating additional fluid from one of the first or second tanks into the blend tank to achieve the target fluid composition. To ensure proper deicing, the method also provides for heating the blended fluid prior to application.

In a novel aspect, the method further provides the step of purging the existing processed blended fluid from the blend tank, the heater, and a device for applying the processed heated blended fluid (e.g., a boom). The purge step is accomplished when the apparatus is shut-down for storage during non-use. Briefly, prior to storage the components and conduits of the apparatus are flushed with a fluid having a concentration of glycol sufficient to prevent freezing, for example, overnight. During the purge step, the apparatus replaces the existing processed blended fluid present in the blend tank, the heater, and the boom with a blended fluid having a composition sufficient to prevent freezing thereof. The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 1A is a side elevation view of one embodiment of the apparatus of the present invention secured to a truck chassis;

FIG. 1B is a top plan view of one embodiment of the apparatus of FIG. 1A;

DETAILED DESCRIPTION

The invention will now be described more fully hereinafter with reference to the accompanying drawings, in which multiple embodiments of the invention are shown. This invention may, however, be embodied in different forms and should not be construed as limited to the embodiments set forth herein. Rather, these embodiments are provided so that this disclosure will be thorough and complete and will fully convey the scope of the invention to those skilled in the art. Like numbers refer to like elements throughout. Further, like numbers with the prime notation refer to like or similar elements of the structure.

Figure 2A:
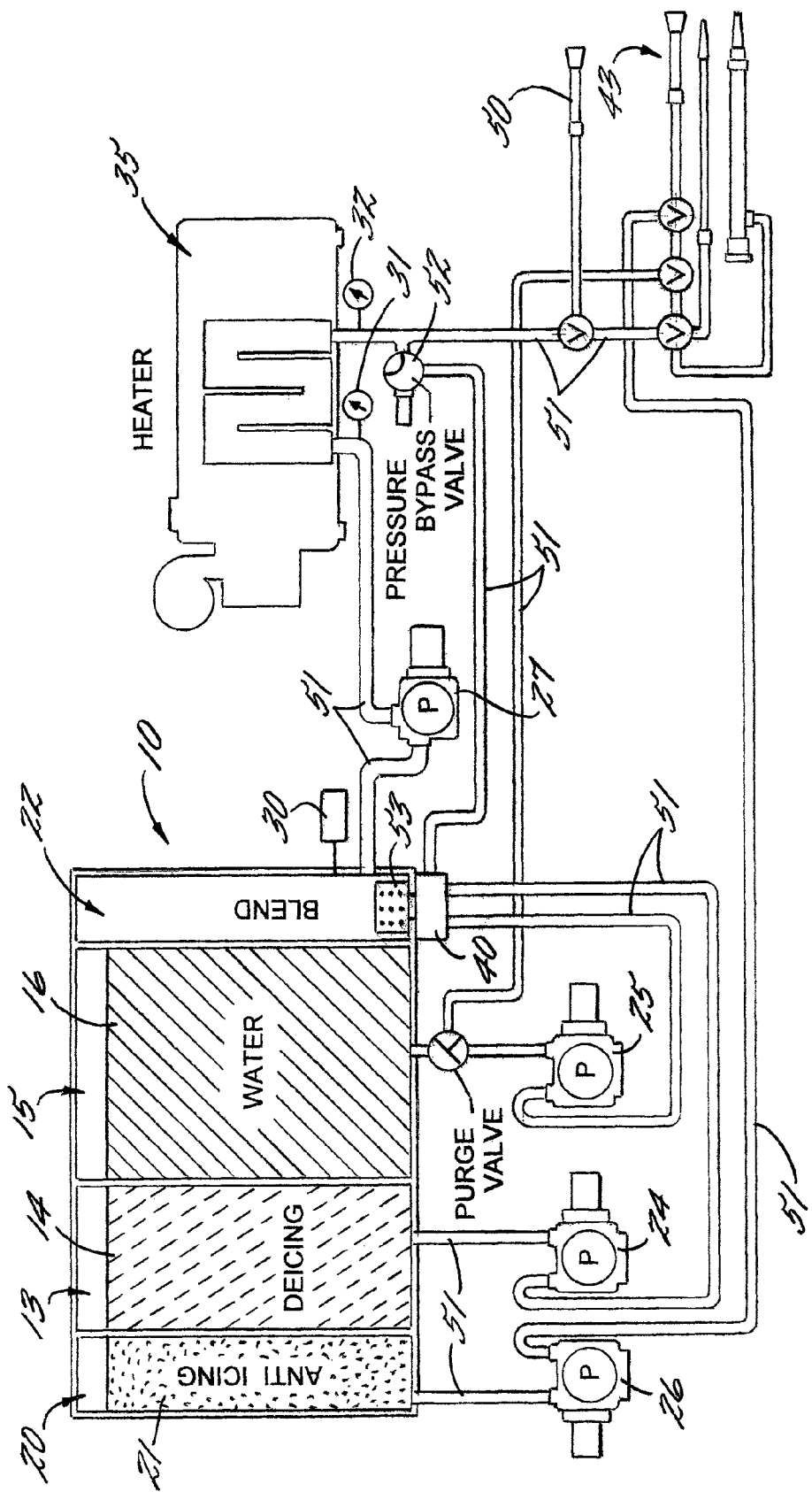
FIG. 2A is a schematic flow diagram of one embodiment of the present invention prior to operation.
Figure 2B:
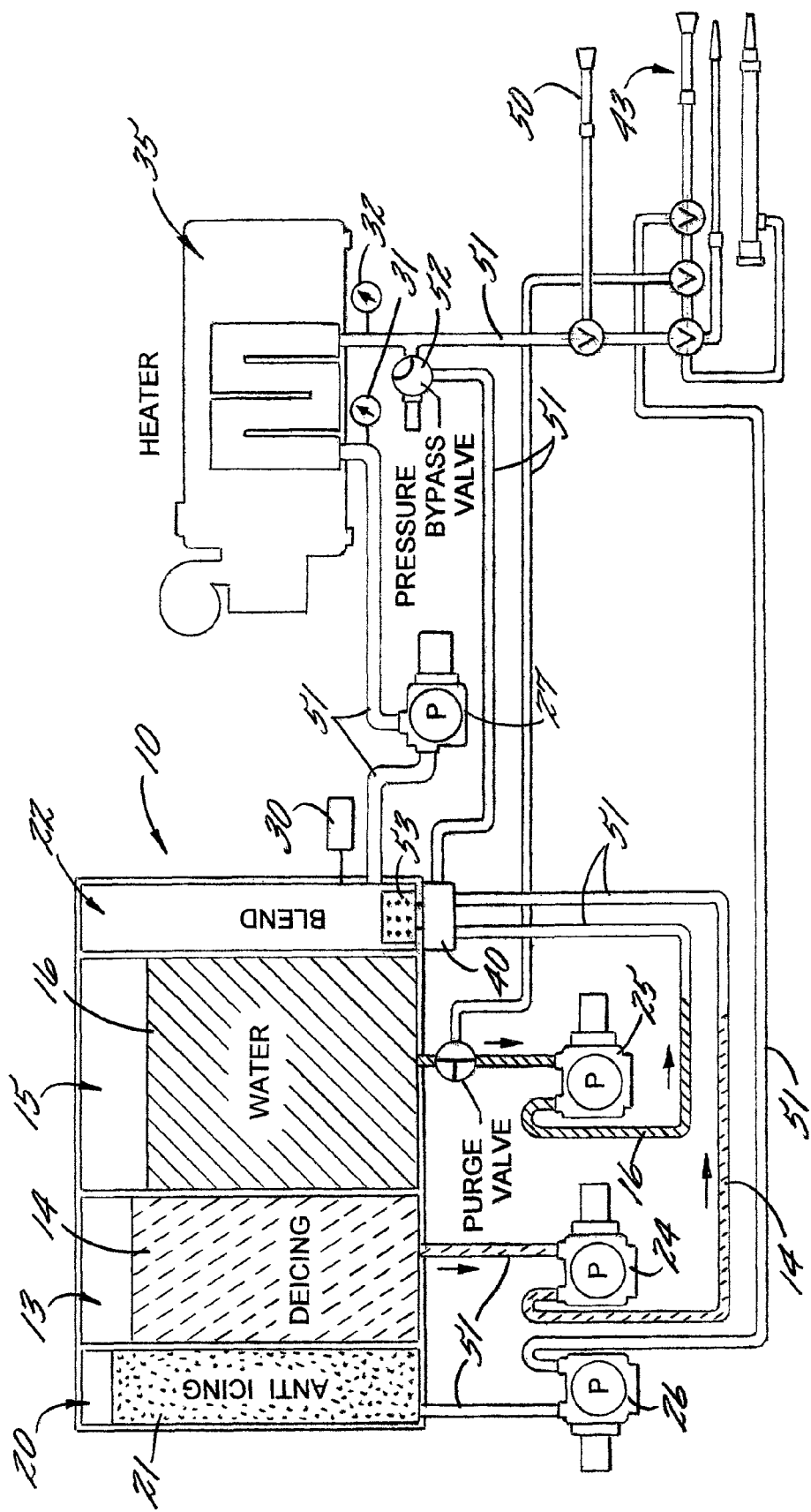
FIG. 2B is a schematic flow diagram of one embodiment of the present invention during operation illustrating fluid advancing from the first and second tanks and through the first and second pumps.
Figure 2C:
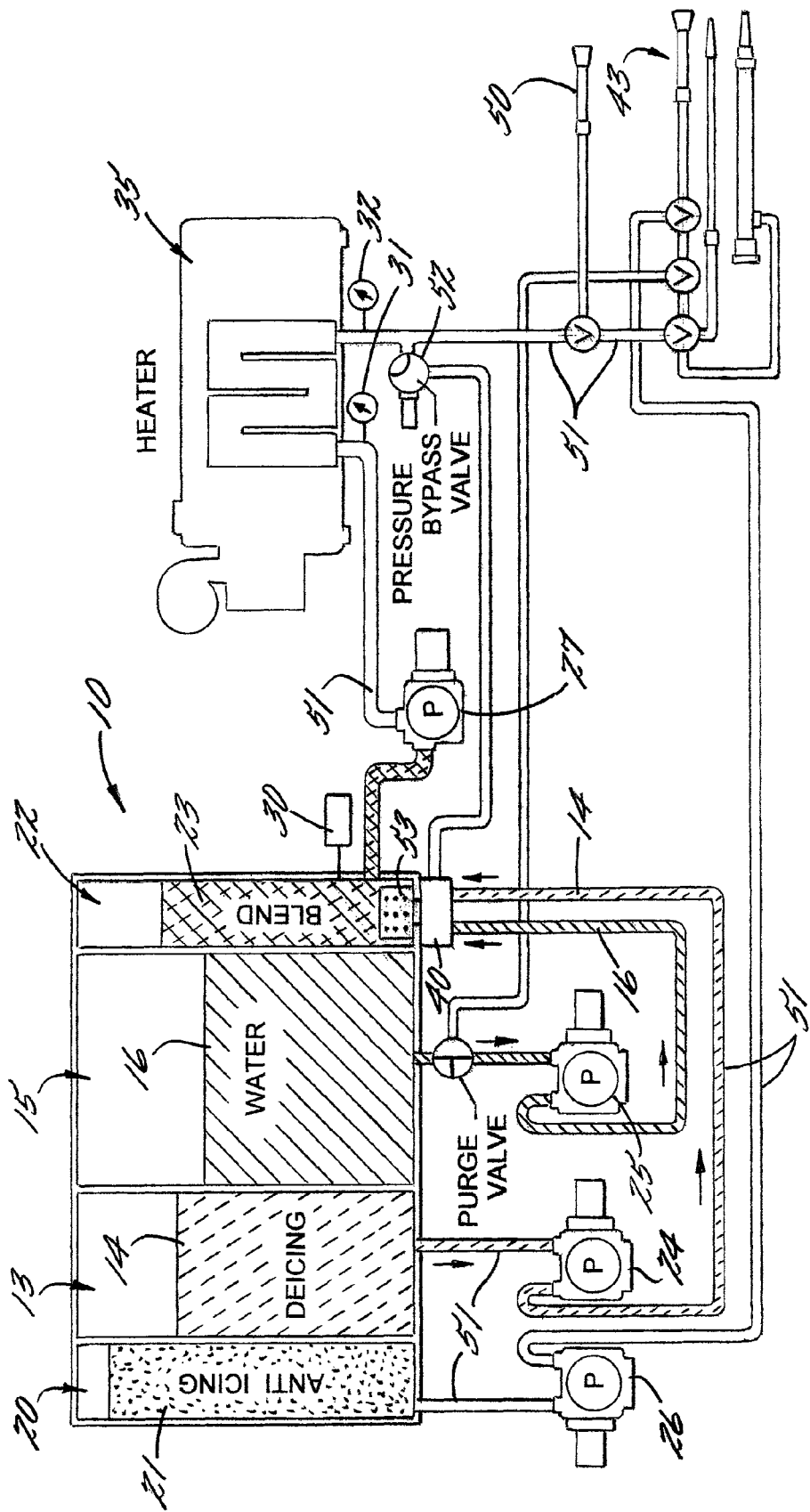
FIG. 2C is a schematic flow diagram of one embodiment of the present invention during operation illustrating the blended fluid in the blend tank.
Figure 2D:
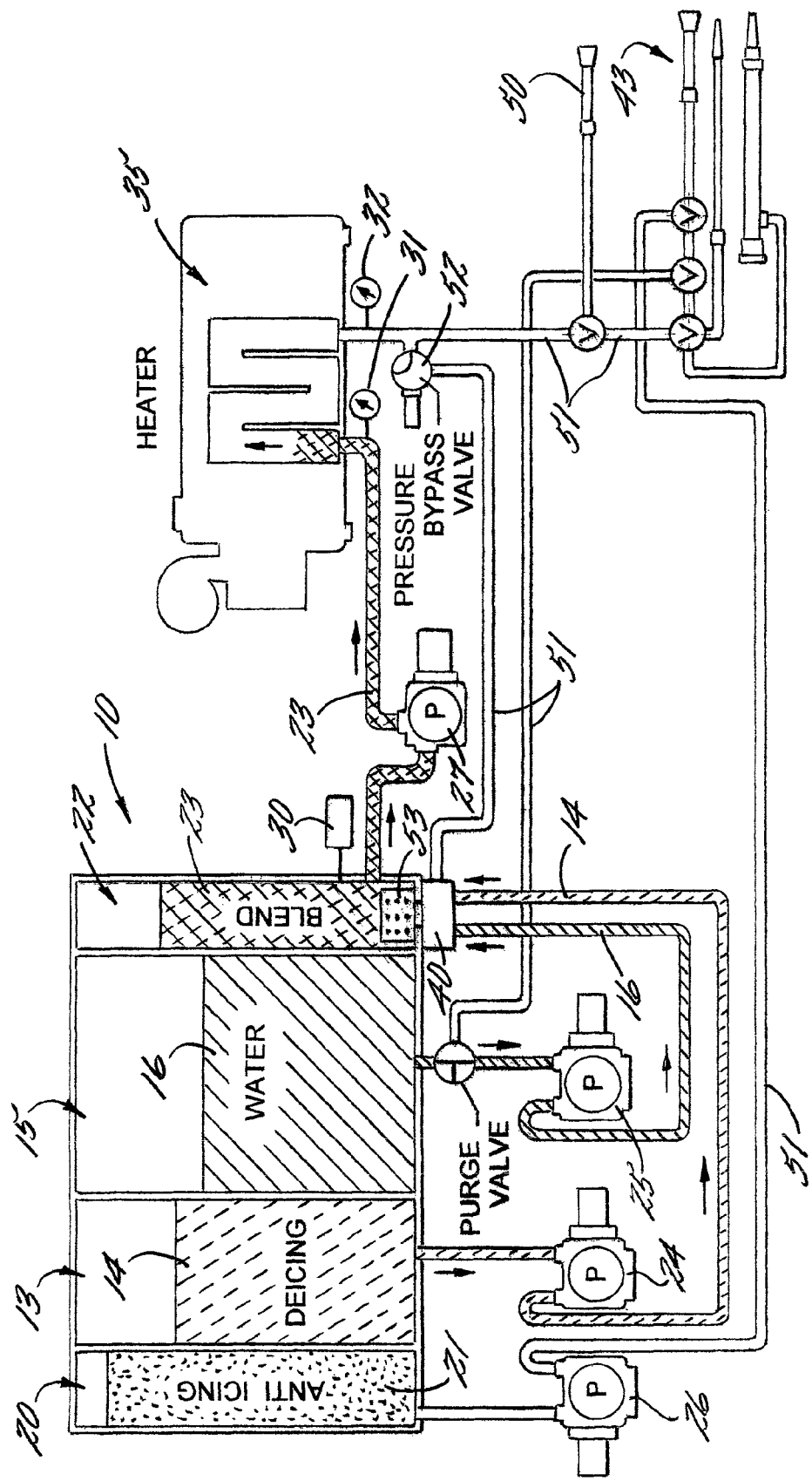
FIG. 2D is a schematic flow diagram of one embodiment of the present invention during operation illustrating the blended fluid advancing through the fourth pump and into the first heater.
Figure 2E:
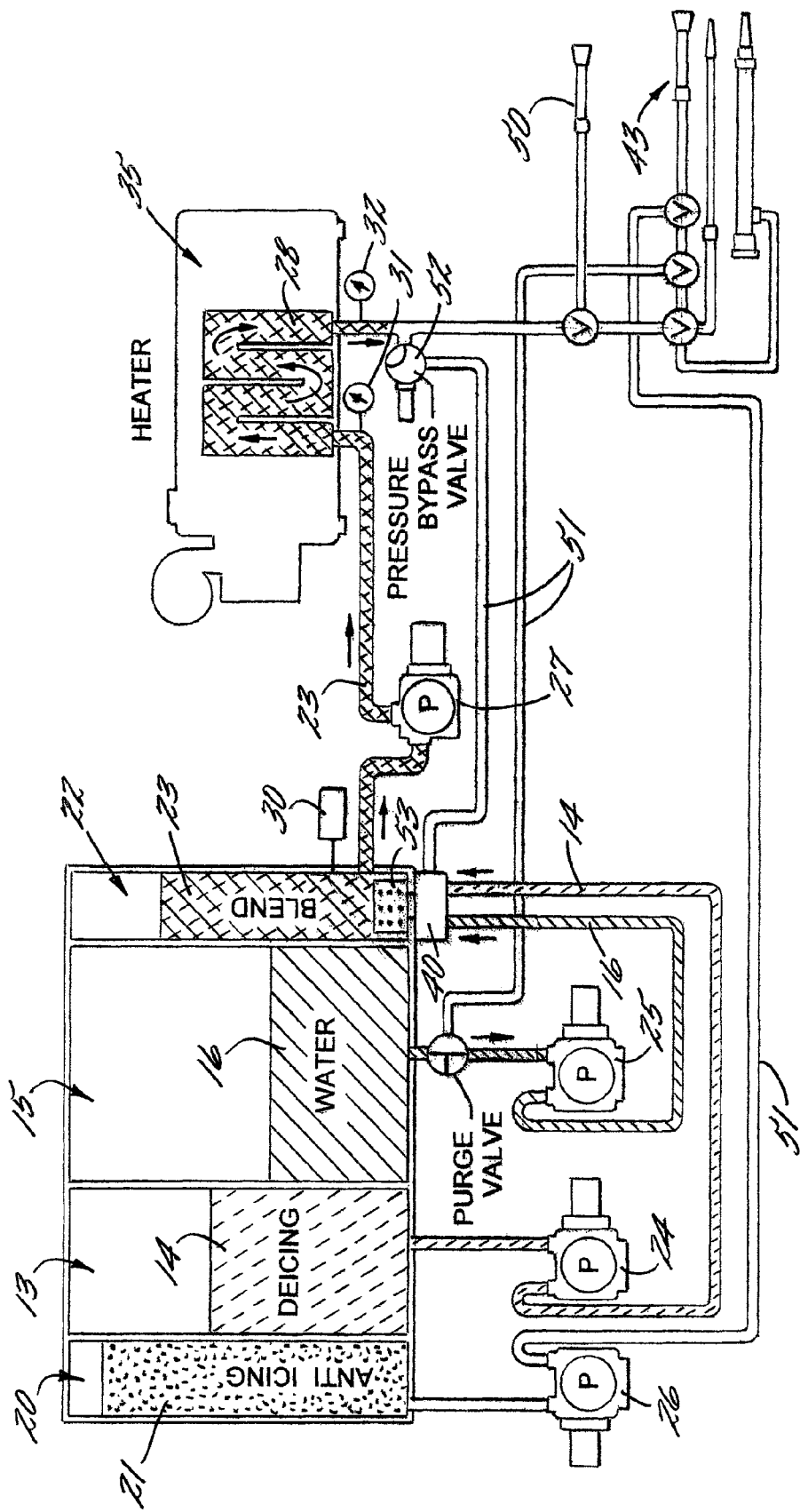
FIG. 2E is a schematic flow diagram of one embodiment of the present invention during operation illustrating the heated blended fluid exiting the first heater.

An overall view of the apparatus 10 for blending fluids that incorporates features of the present invention is set forth in FIGS. 1A and 1B. As depicted in FIG. 1B, the apparatus 10 includes a first tank 13 containing a first fluid 14, a second tank 15 containing a second fluid 16, a third tank 20 containing a third fluid 21, and a blend tank 22 in fluid communication with the first and second tanks. Referring to FIG. 2A, the apparatus 10 also provides a first fluid pump 24 that provides fluid communication between the first tank 13 and the blend tank 22, a second fluid pump 25 that provides fluid communication between the second tank 15 and the blend tank 22, and a third fluid pump 26 in fluid communication with the third tank 20. As illustrated in FIG. 2A, the apparatus 10 includes a fluid analyzer 30 in communication with the blend tank 22. In one embodiment, the fluid analyzer 30 is a refractometer that is positioned substantially adjacent to blend tank 22. Those skilled in the art will also appreciate that the term "adjacent" refers to two or more, for example, components that have a common border or are in close proximity to one another. Nevertheless, it will be understood that adjacent may or may not imply contact, but always implies the absence of anything of the same kind in between. The refractometer identifies the composition of the blended fluid 23 and generates a signal representative thereof.

The apparatus 10 also includes a first temperature sensor 31 for identifying the ambient temperature of the environment, a first controller 33 in communication with the fluid analyzer 30 and the first temperature sensor 31, and a first analyzer 34 in communication with the first temperature sensor 31 and the first controller 33 (see FIG. 1B). Further, the apparatus 10 includes a first heater 35 in fluid communication with the blend tank 22, and a mixing manifold 40 providing fluid communication between the first tank 13, second tank 15, blend tank 22, and first heater 35. In one embodiment, the mixing manifold 40 is positioned substantially adjacent to the blend tank 22.

With reference to FIGS. 1A and 2A, the apparatus 10 provides a delivery device 41 that includes at least one nozzle 43 in fluid communication with the blend tank 22 and the third tank 20. In one embodiment the delivery device 41 is an extendible boom 41. It will be understood that the delivery device 41 is also in communication with the first heater 35. The apparatus 10 also includes a plurality of conduits 51 that promote fluid communication between the tanks, pumps, and delivery device.

In one embodiment of the invention, the first fluid 14 is a deicing fluid, the second fluid 16 is water, and the third fluid 21 is anti-icing fluid. Accordingly, as explained herein, the blend tank 22 contains a blended fluid 23 formed from the first and second fluids. The blend tank 22 incorporates a diffuser 53 positioned in the blend tank 22. The diffuser 53 provides fluid communication between the mixing manifold 40 and the blend tank 22, and operates to distribute the first and second fluids into the blend tank 22.

Figure 2F:
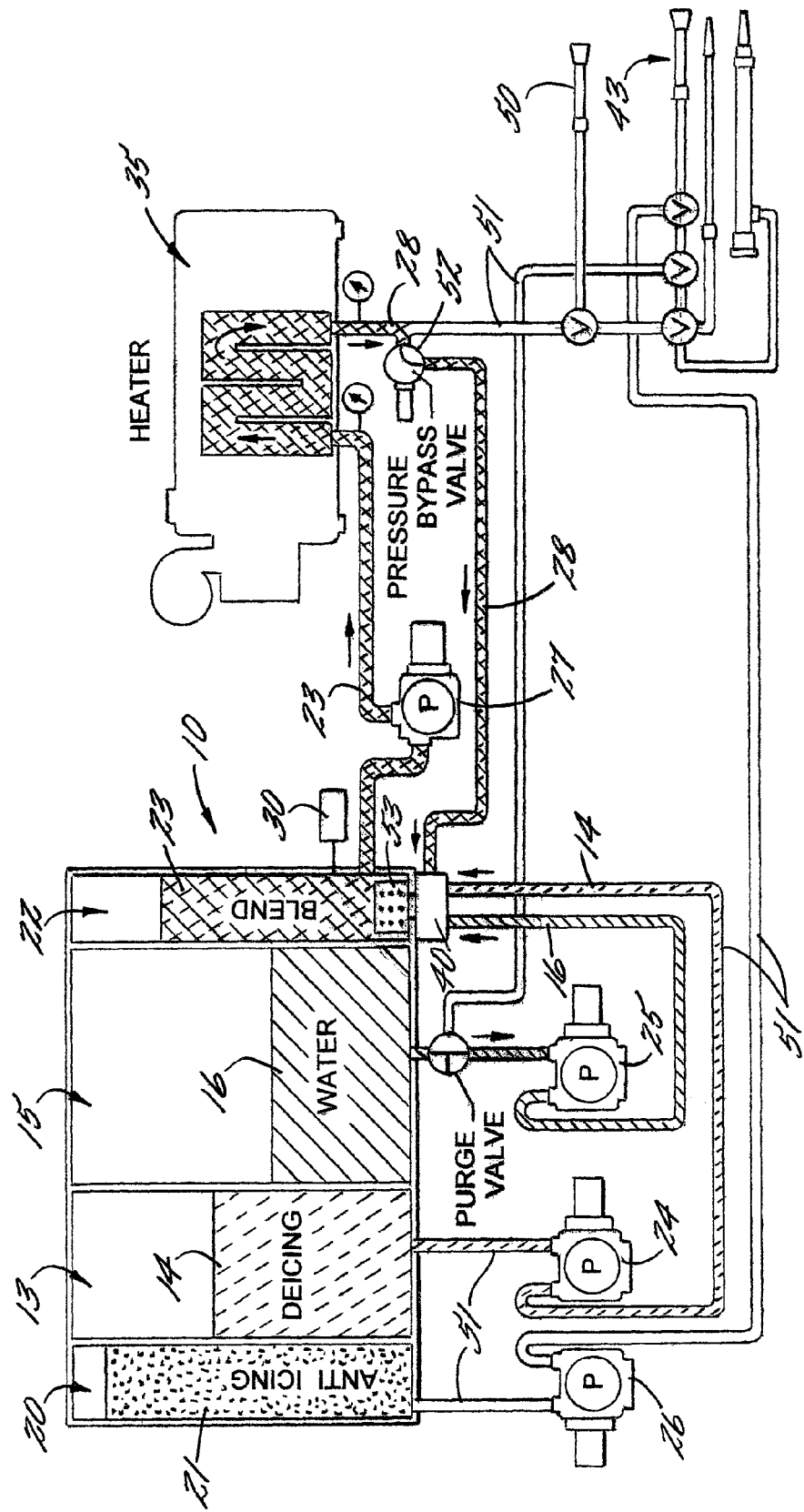
FIG. 2F is a schematic flow diagram of one embodiment of the present invention during operation illustrating the heated blended fluid circulating through the first heater and blend tank.
Figure 2G:
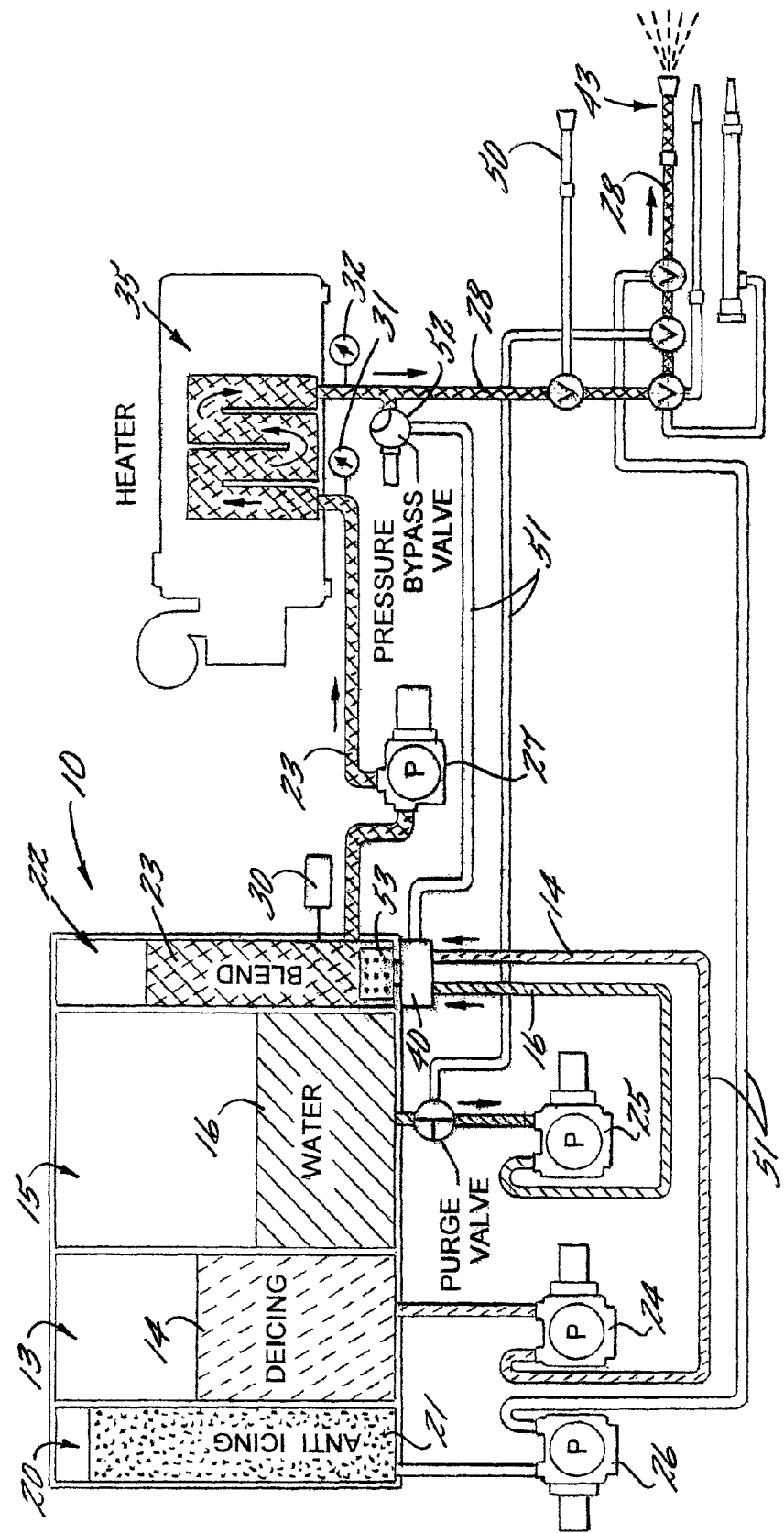
FIG. 2G is a schematic flow diagram of one embodiment of the present invention during operation illustrating the heated blended fluid advancing through the delivery device and exiting one nozzle.
Figure 2H:
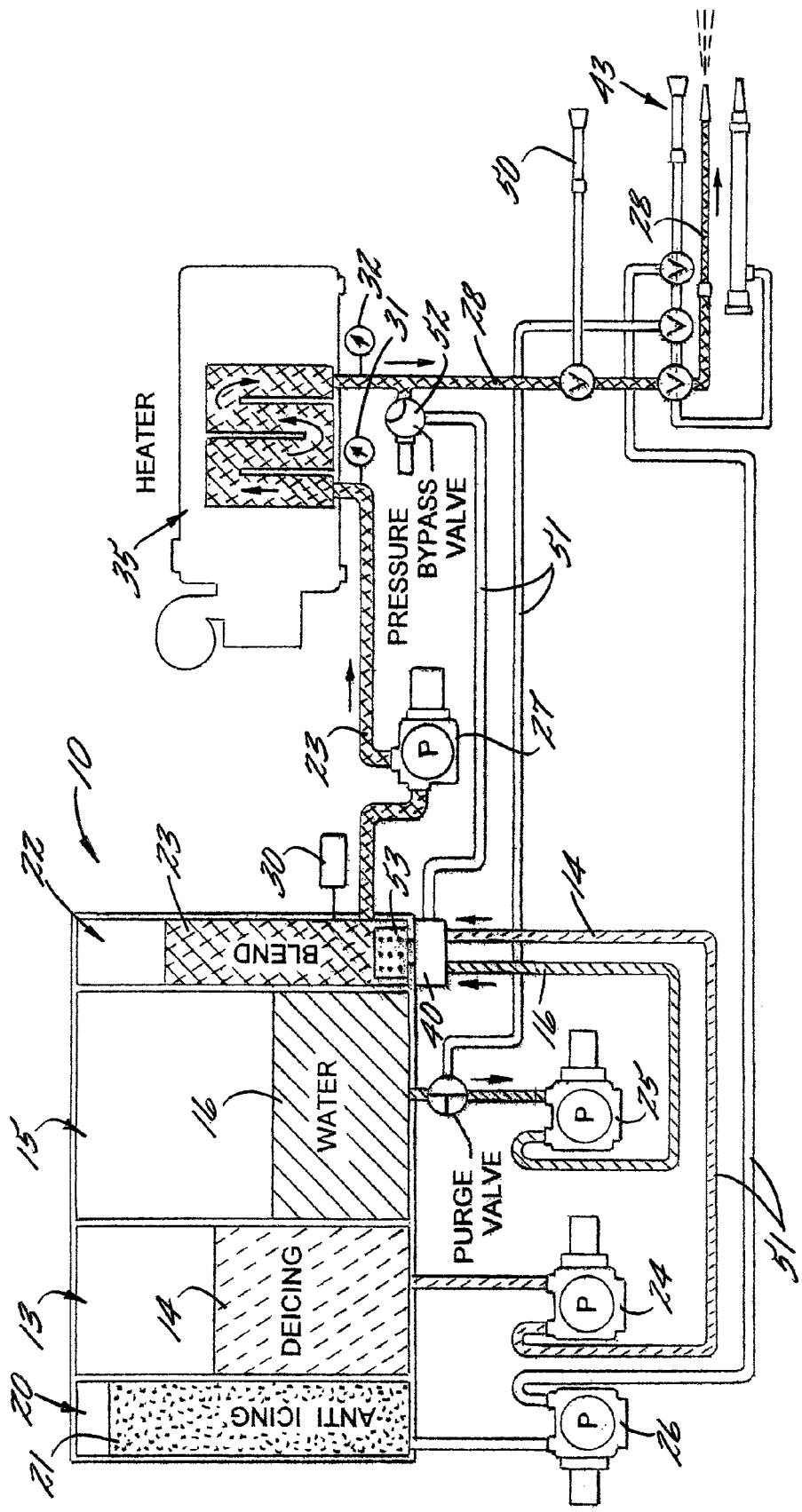
FIG. 2H is a schematic flow diagram of one embodiment of the present invention during operation illustrating the heated blended fluid advancing through the delivery device and exiting another nozzle.
Figure 2:
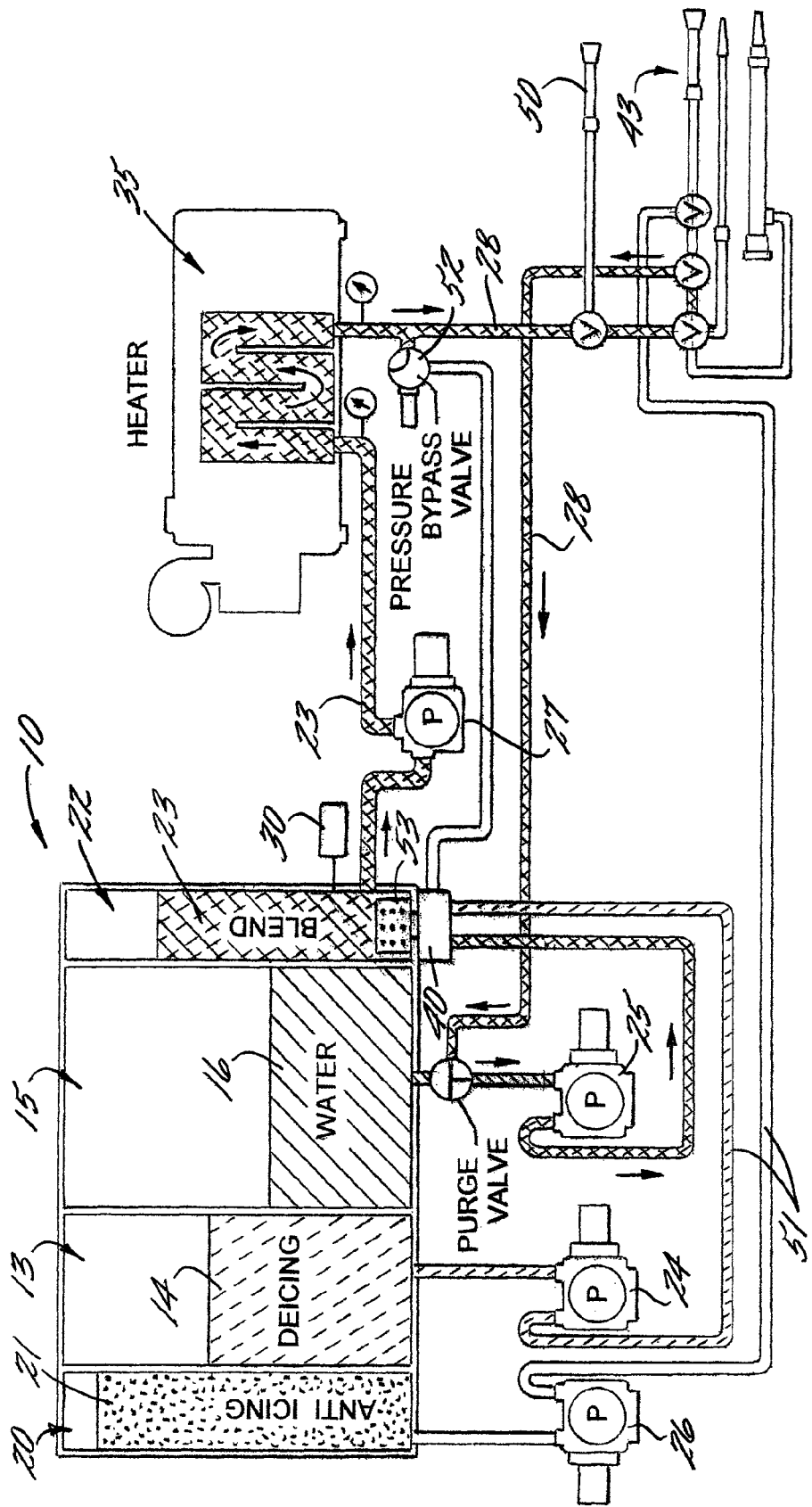
FIG. 2I is a schematic flow diagram of one embodiment of the present invention illustrating the purging of the apparatus.
FIG. 2J is a schematic flow diagram of one embodiment of the present invention during operation illustrating fluid advancing from the third tank, through the third pump, and exiting one of the nozzles.
Figure 2J:
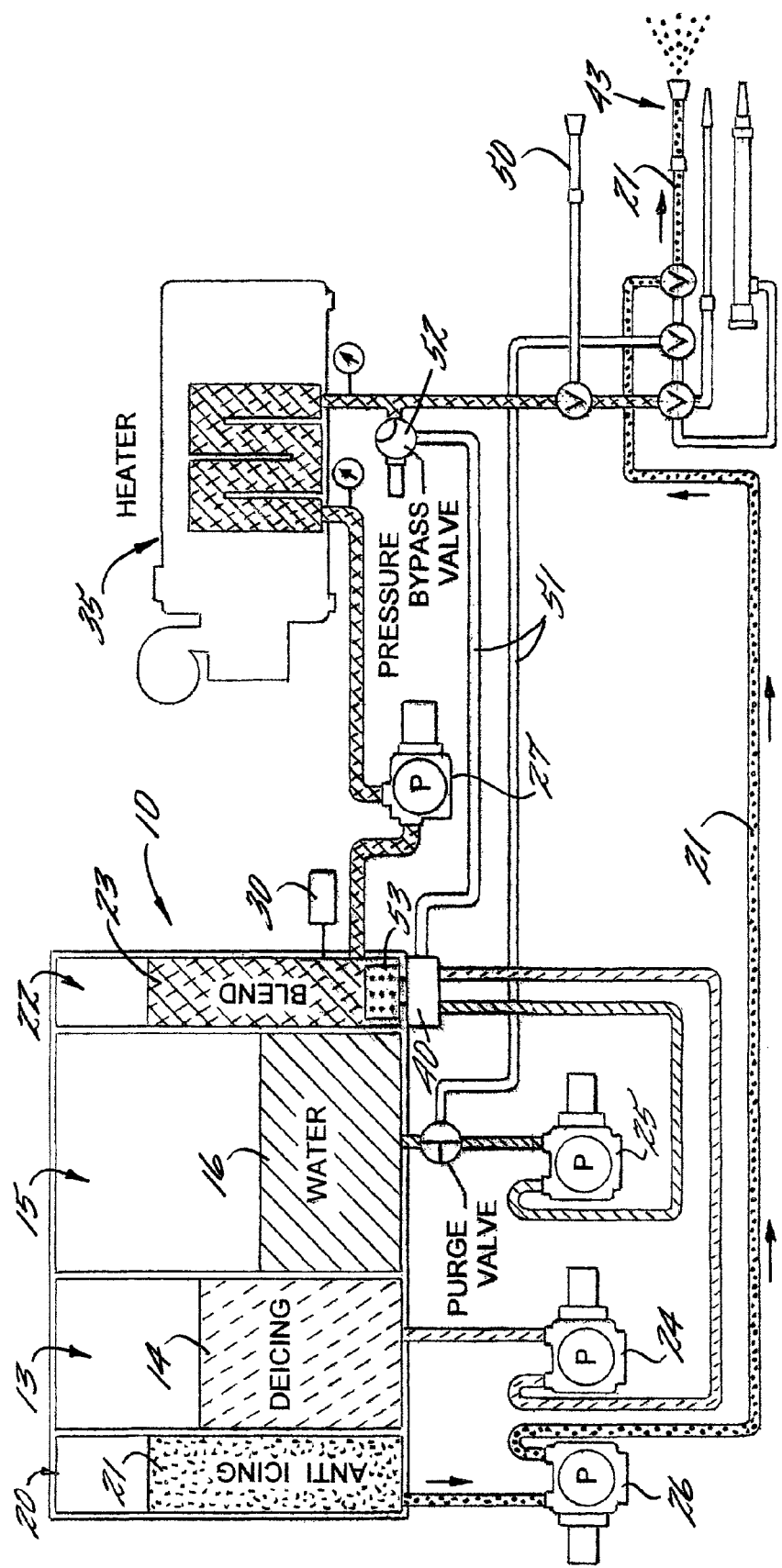

As depicted in FIG. 2J, the third tank 20 is in fluid communication with the delivery device 41 such that the third fluid pump 26 provides fluid communication between the third tank 20 and the delivery device 41. In addition to the first, second, and third pumps 24, 25, 26, a fourth fluid pump 27 is provided. The fourth fluid pump 27 provides fluid communication between the blend tank 22 and the first heater 35. As configured, the fourth fluid pump 27 circulates the blended fluid 23 between the blend tank 22 and the first heater 35. Thus, the plurality of pumps advances the various fluids throughout the apparatus 10. In one embodiment, the first, second, and third fluid pumps 24, 25, 26 are positive displacement pumps, whereas the fourth fluid pump 27 is a centrifugal pump. The conduits 51 provide fluid communication between and among the first tank 13, second tank 15, third tank 20, blend tank 22, heater 35, and delivery device 41.

In one embodiment, the blended fluid 23 is provided by the first and second positive displacement pumps. Each rotation of the pump produces a specific quantity of fluid. The first controller 33 operates the first and second pumps 24, 25 (i.e., advancing the glycol and water) and the first and second fluids are pumped into the blend tank 22 to produce a blended fluid 23 having the required ratio of glycol to water. The apparatus 10 incorporates the fluid analyzer 30 (e.g., an in-line refractometer) in the blend tank 22 to verify the mixture of the blended fluid 23. The refractometer also identifies whether additional fluid (e.g., glycol and water) is required to achieve the desired bland.

A pressure bypass valve 52 facilitates fluid communication between the blend tank 22, the heater 35, and the delivery device 41. As depicted in FIG. 2A, the pressure bypass valve 52 is positioned substantially adjacent to the first heater 35. The pressure bypass valve 52 regulates pressure in the apparatus 10 and facilitates dispersal of fluid from delivery device 41.

A second temperature sensor 32 is secured substantially adjacent to the first heater 35. In one embodiment, the second temperature sensor 32 is secured at the heater outlet to identify the temperature of the heated blended fluid 28 exiting the first heater 35. The second temperature sensor 32 communicates with the second controller 36 of the first heater 35 such that the second controller 36 operates the first heater 35 to control the temperature of the heated blended fluid 28.

Referring to FIG. 1B, the invention may provide a fluid level sensor 54 mounted in the blend tank 22 to monitor fluid level therein. During operation, the fluid level sensor 54 communicates with the first controller 33 such that the first controller 33 activates and deactivates the first and second pumps 24, 25 to maintain desired operating parameters. In particular, the operator may wish to maintain the fluid level in the blend tank 22 at a desired level. The fluid level sensor 54 permits the operator to select such a desired level and rely upon the fluid level sensor 54 to maintain that level.

For example, if the fluid level of the blend tank 22 is above 50% and the ratio of glycol to water in the blended fluid 23 is within acceptable parameters, the first and second pumps 24, 25 are not operating. If the fluid level in the blend tank 22 is below 50%, then the first and second pumps 24, 25 operate to advance, for example, glycol or water, to achieve a combined flow rate equal to the blended fluid 23 flow rate. Fluid level switches are used to monitor the first and second tanks. If either the first or second tanks run empty, the apparatus 10 will shut down and indicate the empty tank on the operator interface display panel discussed herein.

As referenced above, the apparatus 10 provides at least one operator interface display panel that is in communication with the first controller 33. In further detail, the operator interface display panels 44, 45 provide the operator with a means to operate the apparatus 10 through, for example, panels having multi-function displays (MFD). The display panels 44, 45 may display a variety of selectable screens depicting ambient temperature, target fluid composition, blended fluid composition, blended fluid temperature, fluid levels of the various tanks, and status of the various components (e.g., operational or non-operational). Moreover, the displays permit the operator to select the following modes of operation: deice mode, purge mode, or training mode. Further, the displays permit the operator to select and input the target fluid composition.

In one embodiment, the apparatus 10 provides a first operator interface display panel 44 positioned in a chassis cab 17 of the vehicle 11 and a second operator interface display panel 45 positioned in an enclosed cab 42 secured to the extendible boom 41. The first and second operator interface display panels 44, 45 provide communication with the first controller 33. Accordingly, the first controller 33 communicates with the operator interface panels 44, 45 to display, for example, the target fluid composition.

In operation, the first temperature sensor 31 identifies the ambient temperature of the environment and generates a signal representative thereof. The temperature sensor may be secured to any number of positions on the external surface of the apparatus 10. For example, the first temperature sensor 31 can be mounted on the delivery device 41 (e.g., boom), or in another embodiment, on any portion of the vehicle 11 (e.g., chassis 12). The first temperature sensor 31 communicates with the first controller 33 to relay the ambient temperature.

The first analyzer 34 is in communication with the first temperature sensor 31 and first controller 33. The first analyzer 34 determines the target fluid composition based upon the ambient temperature of the environment and communicates the target fluid composition to the first controller 33. It will be understood that the operator can determine the composition of target fluid as an alternative to the first analyzer 34 determining the composition of target fluid.

The first controller 33 is operatively responsive to the first temperature sensor 31 and fluid analyzer 30. In further detail, the first controller 33 is responsive to signals representative of the composition of the blended fluid 23 and the composition of the target fluid. In operation, the first controller 33 compares the composition of the blended fluid 23 to the composition of the target fluid provided by the first analyzer 34. Thereafter, the first controller 33 operates to advance the first and second fluids 14, 16 from the first and second tanks 13, 15, respectively, into the blend tank 22 to achieve and maintain the target fluid composition in the blend tank 22.

Stated differently, the first controller 33 is operatively responsive to the signal representative of the ambient temperature of the environment that is provided by the first analyzer 34. The first controller 33 operates to achieve and maintain the target fluid composition. During operation, the first controller 33 operates the first and second fluid pumps to control the rate of flow of each of the first and second fluids into the blend tank 22 to achieve the target fluid composition.

In one embodiment of the present invention, the first and second pumps 24, 25 include one or more proportional control valves for controlling the rate of flow of the first and second fluids 14, 16 through the first and second fluid pumps 24, 25. The apparatus 10 also provides one or more speed sensors (e.g., pulse pick-up units) for monitoring the rate of speed of the first and second fluid pumps 24, 25 and a generating a signal representative thereof. Thereafter, the speed sensors communicate with the first controller 33 such that the first controller calculates the rate of flow of the first and second fluids 14, 16 and operates the proportional control valves to control the rate of flow of each of the first and second fluids 14, 16 into the blend tank 22 to achieve and maintain the target fluid composition.

As discussed, the composition of the target fluid depends upon the ambient temperature of the environment. In other words, the target fluid composition must be sufficient to deice an aircraft given the current weather conditions (i.e., current ambient temperature). In addition, the present invention incorporates a programmable temperature buffer dictated by the Federal Aviation Authority (FAA). Specifically, the first analyzer 34 incorporates a temperature buffer approximately equivalent to 18° F. when determining the composition of a fluid required to deice an aircraft. Once the first analyzer 34 determines the freezing point of a particular blended fluid based upon current ambient temperature (e.g., 0° F.), the first analyzer 34 incorporates a buffer of approximately 18° F. By doing so, the target fluid composition is capable of withstanding much colder conditions without freezing (e.g., −18° F.). Alternatively, the operator may incorporate a predetermined temperature buffer into the apparatus 10 via one of the operator interface display panels 44, 45.

In one embodiment, the first temperature sensor 31 secured to the boom 41 records the outside ambient temperature and the first analyzer 34 determines the appropriate blending percentage of water and glycol. The operator may also incorporate a buffer between the freeze point of the deicing fluid 14 and the outside ambient temperature. When the first analyzer 34 determines that a change in ambient temperature requires a change in the percentage of glycol, the apparatus 10 requires approximately less than three minutes to achieve the target fluid composition in the blend tank 22.

During the deicing mode of operation, the operator may rely upon automatic or manual means to select the ratio of the blended fluid 23. Specifically, the operator may rely upon the first controller 33 to determine a glycol to water ratio based upon the current ambient temperature or the operator may manually select a glycol to water ratio. During operation, a process instrumentation (PI) loop utilizes the desired blend ratio as its command input and the refractometer as its feedback input.

During anti-icing operations, the first controller 33 operates the third fluid pump 26 to control the rate of flow of the third fluid 21 (e.g., anti-icing fluid) to the extendible boom 41 for application to the surface of an aircraft.

In a novel aspect, the first heater 35 is spaced apart from the blend tank 22 and includes a second controller 36 for operating the first heater 35. Known apparatus incorporate in-line heaters or heat exchangers. In-line heaters and heat exchangers are much less efficient than the type incorporated into the present apparatus 10. For example, one embodiment of the invention incorporates a separate heating unit provided by Sage that is capable of providing 3.4 million British Thermal Units (BTU).

With respect to the delivery device 41, one embodiment of the invention provides an extendible boom 41 having one or more nozzles 43 configured to apply the heated blended fluid 28 and the third fluid 21 to the surface of an aircraft. The extendable boom 41 may include an enclosed cab 42 secured to an end of the boom.

As an alternative to the nozzles 43 positioned substantially adjacent to the enclosed cab 42, the invention provides a ground line in fluid communication with the blend tank 22 and heater 35. The ground line includes at least one nozzle 50 connected thereto and extending from the apparatus 10. The ground line is available to an operator on the ground and permits deicing operations at ground level for surfaces not accessible to the enclosed cab 42.

During operation, the blended fluid 23 is continuously circulated between the blend tank 22, the first heater 35, and the delivery device 41 (see FIG. 2F). The continuous circulation permits the apparatus 10 to rapidly achieve and maintain a desired temperature of the heated blended fluid 28. Moreover, the heated blended fluid 28 is continuously circulated during operation between the blend tank 22, the first heater 35, and the delivery device 41 such that the blended fluid is homogeneous. It will be understood that the term "homogeneous" refers to a fluid having the same kind of constituent elements or being similar in nature. By continuously circulating the blended fluid 28, a consistent composition is maintained, thereby facilitating rapid and successful deicing operations.

Advantageously, the incorporation of a blend tank 22 avoids problems existing in known systems. Known systems typically advance heated water and cold glycol to the delivery device 41 (e.g., along an extendible boom) and then mix the heated water and glycol just prior to the nozzle. Unfortunately, this leads to instances where the percentage of glycol moves outside of the acceptable range necessary to deice a surface. Unacceptable ranges of glycol result from uneven mixing of fluids and back pressure in the boom 41. The present invention system operates to blend the fluid in a blend tank 22 and then heat the blended fluid 23 in a heater 35 (e.g., a 3.4 million BTU Sage heater). The present method of blending the fluid and then heating the blended fluid 23 in a heater provides a more uniform blend.

The recirculation of blended fluid 23 accomplishes two purposes. First, the recirculation permits the apparatus 10 to adjust all of the blended fluid if a change in the ratio of glycol to water is required (e.g., change in ambient temperature). Second, the recirculation permits the blended fluid 23 to constantly move through the heater 35. Known systems permit the blended fluid 23 in the boom 41 to cool off when the system is not operating (i.e., not spraying fluid on an aircraft).

In one embodiment illustrated in FIGS. 2C-2G, the present system incorporates a centrifugal pump (i.e., fourth fluid pump 27) to move fluid from the blending tank through the heater 35 and out of the nozzle 43. During operation, the fourth fluid pump 27 moves fluid from the blend tank 22 through the heater 35 and back to the blend tank 22. This action creates a mixing action absent from known systems.

In another novel aspect, the apparatus 10 may operate in a purge or flush mode. The goal of the purge mode is to flood conduits 51 and components of the apparatus 10 with a blend of deicing fluid and water sufficient to prevent the fluid in the conduits 51, blend tank 22, and pumps 24, 25, 27 from freezing, for example, overnight when the apparatus 10 is not operating. In further detail, the apparatus 10 operates to purge the existing blended fluid 23 from the blend tank 22, the first heater 35, the delivery device 41, and the second fluid pump 25, and then replace the existing blended fluid 23 contained therein with a blended fluid having a composition sufficient to prevent freezing of the various components. As illustrated in FIG. 2I, the first pump 24 advances the first fluid 14 from the first tank 13, through the blend tank 22, first heater 35, delivery device 41, and second pump 25, and into the blend tank 22 to replace the existing blended fluid 23 contained therein with a blended fluid having a composition sufficient to prevent freezing thereof.

In one embodiment of the purge mode, deicing fluid 14 advances from the first tank 13 to the first pump 24, from the first pump 24 to the blend tank 22, from the blend tank to the fourth pump 27, from the fourth pump 27 to the heater 35, from the heater 35 to the delivery device 41, from the delivery device 41 to the second pump 25, and from the second pump 25 to the blend tank 22. During the purge mode, the purge valve prevents the blended fluid 23 from entering the second tank 15 containing, for example, water. Accordingly, the second tank may be drained into the environment without threat of contamination. During the purge mode, it will be understood that the conduits 51 connecting the first tank 13 and the first pump 24 and the first pump 24 and the blend tank 22 retain 100% deicing fluid 21 (see FIG. 2C).

An operator may manually select the purge mode via one of the operator interface display panels 44, 45. Alternatively, the apparatus 10 may automatically initiate the purge mode if the operator does not select manual purge on the operator interface within a specified time prior to shutdown.

By purging the system, conduits 51 or lines providing fluid communication between the blend tank 22, heater 35, and delivery device 41 are filled with a preset ratio of glycol to water mixture. This prevents freezing in the lines. The ratio of the blended fluid 23 for use in purging the apparatus 10 may be set by the operator manipulating the operator interface. It will be understood that the purge mode may be manually initiated via the operator interface or automatically initiated when the ignition switch input is turned off. Once the ignition switch input transitions to off, a purge mode screen will appear asking the operator to initiate purge mode. If after five seconds no selection has been made the system will automatically purge. The purge mode will run until the purge ratio is met. Thereafter the engine enable output is turned off. The first and second pumps 24, 25 are turned off once the purge is complete. In one embodiment, low-level switches for the water and glycol are ignored during the purge cycle.

In further detail, one embodiment of the apparatus 10 may incorporate a 250 gallon blend tank 22. The capacity used in the blend tank 22 varies depending on the percent of glycol being sprayed. If the operator uses a 20% blend, the tank 22 will remain at about 125 gallons (i.e., 40% or 200 gallons). This allows the system to add 100% glycol to the blend tank 22 during the purge process and bring the blended fluid 23 in the apparatus 10 up to a 50/50 blend of glycol to water. After the apparatus 10 adds neat deicing fluid to the blend tank 22, that 50/50 mixture is pumped through the pumps, heater 35, conduits 51 leading to the boom 41, and back to a portion of the conduit leading from the second tank 15 (i.e., water tank).

The conduit 51 leading from the water tank 15 includes a purge valve (e.g., an electric valve) that closes during the purge process. After purging the apparatus 10, the blended fluid 23 (e.g., 50/50 blend of glycol and water) is present throughout the apparatus 10 except the water tank 15. The water tank 15 can then be drained, or plugged and heated with second and third heaters 37, 38 positioned in the water tank. Advantageously, the present apparatus 10 does not add glycol to the water tank—as occurring in known systems. Thus, the water tank of the present invention remains free of contaminants (e.g., glycol) and the water may be drained onto the ground for long-term storage of the truck.

As discussed above, the apparatus 10 may optionally include a second and third heater 37, 38 positioned in the second tank 15. If the second tank 15 is filled with water, the second and third heaters 37, 38 prevent the water from freezing overnight if the system is not operating. In one embodiment, the second and third heaters 37, 38 are immersion heaters. The second heater 37 may operate when the apparatus 10 is in use and may be powered by electricity generated by the apparatus 10 (e.g., an inverter on the truck chassis 12). The third heater 38 may operate when the apparatus 10 is not in use and may be powered by an external power source via a power cord. Advantageously, it is not necessary to drain water from the second tank 15 when the apparatus 10 is not in operation if the operator elects to use one of the heaters to prevent the water contained in the second tank 15 from freezing.

In another embodiment, the apparatus 10 may be secured to a vehicle 11 having a chassis 12 and a cab 17. In particular, the invention provides a vehicle-mounted apparatus 10 for applying a blended heated fluid to a surface of an aircraft. In this embodiment, the first, second, third, and blend tanks are secured to the vehicle 11. Further, the first, second, third, and fourth fluid pumps 24, 25, 26, 27 are secured to the vehicle 11. Still further, the first temperature sensor 31, first controller 33, first heater 35, second controller 36, and delivery device 41 are secured to the vehicle 11. As configured, this embodiment facilitates mobile deicing operations.

Another aspect of the invention provides for a method of applying a blended fluid 23 to an aircraft that incorporates the apparatus 10. The method of applying the blended fluid 23 includes the steps of defining the composition of a target fluid, mixing a first fluid 14 from a first tank 13 and a second fluid 16 from a second tank 15 in a blend tank 22 to form a blended fluid 23, measuring the composition and temperature of the blended fluid 23, manipulating the blended fluid 23 to create a processed blended fluid 23 having a composition substantially equivalent to the composition of the target fluid, and applying the processed blended fluid 23 to an aircraft. It will be understood that the term "processed" refers to the treatment or preparation of something in a series of steps or actions.

Initially, the temperature sensor 31 relays the ambient temperature of the environment to the first analyzer 34, and the first analyzer 34 determines the composition of the target fluid based upon the ambient temperature. In other words, the method includes the step of defining the composition of a target fluid which entails measuring the ambient temperature and the determining the composition of a fluid required to deice an aircraft based upon the measured ambient temperature. The composition of the target fluid may be defined automatically by the first analyzer 34 or manually by an operator. The step of determining the composition of a fluid required to deice an aircraft comprises incorporating a buffer range of temperature to determine the composition of a fluid required to deice an aircraft.

The next step of the inventive method includes mixing the first fluid 14 from the first tank 13 and the second fluid 16 from the second tank 15 in the blend tank 22 to form a blended fluid 23. Upon mixing, the method includes the step of measuring the composition and temperature of the blended fluid 23. In one embodiment, the method incorporates a refractometer 30 secured to the blend tank 22 to measure the composition of the blended fluid 23 and a temperature sensor 32 secured to the first heater 35 outlet to measure the temperature of the blended fluid 23.

Thereafter, the method includes the steps of manipulating the blended fluid 23 to create a processed blended fluid having a composition substantially equivalent to the composition of the target fluid, and then applying the processed blended fluid to an aircraft.

Prior to the step of manipulating the blended fluid 23, the method provides the step of comparing the measured composition of the blended fluid 23 to the composition of the target fluid to determine whether the composition of the blended fluid 23 is substantially equivalent to the composition of the target fluid.

Next, the step of manipulating the blended fluid 23 includes adjusting the composition of the blended fluid 23 by incorporating additional fluid 14, 16 from one of the first or second tanks 13, 15 into the blend tank 22 to achieve the target fluid composition. To ensure proper deicing, the method also provides for heating the blended fluid 23 prior to application.

In particular, the step of manipulating the blended fluid 23 comprises heating the blended fluid 23 in a heater 35 spaced apart from the blend tank 22 to produce a processed heated blended fluid 28. Thereafter, the method provides the step of directing the processed heated blended fluid 28 into the blend tank 22 prior to the step of applying the processed heated blended fluid to the aircraft.

One embodiment of the present method includes the step of applying an anti-icing fluid from an anti-icing fluid tank to the aircraft after the step of applying the processed blended fluid 23 to the aircraft. This step prevents ice from forming on the surfaces of the aircraft.

In a novel aspect, the method further provides the step of purging the existing processed blended fluid 23 from the blend tank 22, the heater 35, and a device 41 for applying the processed heated blended fluid 28. The purge step is accomplished when the apparatus 10 is shut-down for storage during non-use. Briefly, prior to storage, the components of the apparatus 10 to include conduits 51 are flushed with a fluid having a concentration of glycol sufficient to prevent freezing, for example, overnight. During the purge step, the apparatus 10 replaces the existing processed blended fluid present in the blend tank 22, the heater 35, and the delivery device 41 with a blended fluid having a composition sufficient to prevent freezing thereof.

The invention claimed is:

1. An apparatus for blending fluids comprising:
    a first tank containing a first fluid;
    a second tank containing a second fluid;
    a blend tank in fluid communication with said first and second tanks, said blend tank for containing a blended fluid formed from the first and second fluids;
    a fluid analyzer for identifying the composition of the blended fluid, said fluid analyzer positioned substantially adjacent to said blend tank;
    a first controller operatively responsive to signals representative of the composition of the blended fluid and the composition of a target fluid, said first controller in communication with said fluid analyzer;
    a first heater spaced apart from, yet in fluid communication with, said blend tank, said first heater having a second controller for operating said first heater;
    a mixing manifold providing fluid communication between said first tank, said second tank, said blend tank, and said first heater; and
    a delivery device for applying the heated blended fluid to a surface, said delivery device in fluid communication with said blend tank and said first heater;
    wherein said first controller compares the composition of the blended fluid to the composition of the target fluid and advances the first and second fluids from said first and second tanks, respectively, into said blend tank to achieve and maintain the target fluid composition in said blend tank.

2. The apparatus according to claim 1 wherein the first fluid is a deicing fluid and the second fluid is water.

3. The apparatus according to claim 1 wherein the blended fluid is continuously circulated between said blend tank, said first heater, and said delivery device during operation to achieve and maintain a desired temperature of the heated blended fluid.

4. The apparatus according to claim 1 wherein the blended fluid is continuously circulated during operation between said blend tank, said first heater, and said delivery device such that the blended fluid is homogeneous.

5. The apparatus according to claim 1 wherein said fluid analyzer comprises a refractometer for measuring the composition of the blended fluid.

6. The apparatus according to claim 1 wherein said delivery device comprises an extendible boom having one or more nozzles.

7. The apparatus according to claim 1 further comprising:
    a first fluid pump providing fluid communication between said first tank and said blend tank; and
    a second fluid pump providing fluid communication between said second tank and said blend tank.

8. The apparatus according to claim 7 wherein said first controller operates said first and second fluid pumps to control the rate of flow of each of the first and second fluids into said blend tank to achieve and maintain the target fluid composition.

9. The apparatus according to claim 7 wherein said first and second pumps include:
    one or more proportional control valves for controlling the rate of flow of the first and second fluids through said first and second fluid pumps; and
    one or more speed sensors for monitoring the rate of speed of the first and second fluid pumps and generating a signal representative thereof.

10. The apparatus according to claim 9 wherein said one or more speed sensors communicates with said first controller such that said first controller calculates the rate of flow of the first and second fluids and operates said one or more proportional control valves to control the rate of flow of each of said first and second fluids into said blend tank to achieve and maintain the target fluid composition.

11. The apparatus according claim 1, further comprising a purge valve connected to said blend tank and operating to purge the existing blended fluid from said blend tank, said first heater, said delivery device, and said second fluid pump and replace the existing blended fluid contained therein with a blended fluid having a composition sufficient to prevent freezing thereof.

12. The apparatus according to claim 11 operating to prevent the blended fluid from entering said second tank such that said second tank may be drained into the environment.

13. The apparatus according to claim 1 further comprising at least one operator interface display panel in communication with said first controller.

14. The apparatus according to claim 1 further comprising:
a first temperature sensor secured to an external surface of said apparatus, said first temperature sensor for identifying the ambient temperature of the environment and generating a signal representative thereof; and
a first analyzer in communication with said first temperature sensor and said first controller, said first analyzer for determining the target fluid composition based upon the ambient temperature of the environment and communicating the target fluid composition to said first controller.

15. The apparatus according to claim 14 wherein:
said first controller is operatively responsive to the signal representative of the ambient temperature of the environment; and
said first controller operates to achieve and maintain the target fluid composition.

16. The apparatus according to claim 1 further comprising at least one heater positioned in said second tank.

17. The apparatus according to claim 1 further comprising:
wherein said second fluid is water;
a third tank containing a third fluid, said third tank in fluid communication with said delivery device; and
a third fluid pump providing fluid communication between said third tank and said delivery device.

18. The apparatus according to claim 17 wherein the third fluid is an anti-icing fluid.

19. The apparatus according to claim 17 wherein said first, second, and third fluid pumps are positive displacement pumps.

20. The apparatus according to claim 1 further comprising a fourth fluid pump providing fluid communication between said blend tank and said first heater, said fourth fluid pump for circulating the blended fluid between said blend tank and said first heater.

21. The apparatus according to claim 20 wherein said fourth fluid pump is a centrifugal pump.

22. The apparatus according to claim 1 further comprising a plurality of conduits providing fluid communication between and among said first tank, said second tank, said blend tank, said heater, and said delivery device.

23. The apparatus according to claim 1 further comprising a pressure bypass valve facilitating fluid communication between said blend tank, said heater, and said delivery device, said pressure bypass valve positioned substantially adjacent to said first heater.

24. The apparatus according to claim 1 further comprising a diffuser positioned in said blend tank, said diffuser providing fluid communication between said mixing manifold and said blend tank, said diffuser distributing the first and second fluids into the blend tank.

25. The apparatus according to claim 1 further comprising a second temperature sensor secured substantially adjacent to said first heater, said second temperature sensor for identifying the temperature of the heated blended fluid, said second temperature sensor communicating with said second controller such that said second controller operates said first heater to control the temperature of said heated blended fluid.

26. The apparatus according to claim 1 further comprising a fluid level sensor mounted in said blend tank to monitor fluid level in said blend tank, said fluid level sensor communicating with said first controller such that said controller activates and deactivates said first and second pumps to maintain desired operating parameters.

27. The apparatus according to claim 1 mounted on a vehicle.

28. A vehicle-mounted apparatus for applying a blended heated fluid to a surface of an aircraft comprising:
a first tank secured to the vehicle and containing a first fluid;
a second tank secured to the vehicle and containing a second fluid;
a third tank secured to the vehicle and containing a third fluid;
a blend tank secured to the vehicle and in fluid communication with said first and second tanks, said blend tank for containing a blended fluid formed from the first and second fluids;
a first fluid pump secured to the vehicle and providing fluid communication between said first tank and said blend tank;
a second fluid pump secured to the vehicle and providing fluid communication between said second tank and said blend tank;
a third fluid pump secured to the vehicle and in fluid communication with said third tank;
a refractometer positioned substantially adjacent to and in communication with said blend tank, said refractometer for identifying the composition of the blended fluid and generating a signal representative thereof;
a first temperature sensor secured to the vehicle, said first temperature sensor for identifying the ambient temperature of the environment and generating a signal representative thereof;
a first controller mounted to the vehicle and in communication with said refractometer and said first temperature sensor, said first controller operatively responsive to signals representative of the composition of the blended fluid and a composition of a target fluid;
a first heater spaced apart from, yet in fluid communication with, said blend tank, said first heater having a second controller for operating said first heater;
a mixing manifold positioned substantially adjacent to said blend tank and providing fluid communication between said first tank, said second tank, said blend tank, and said first heater; and
an extendible boom connected to the vehicle and having at least one nozzle in fluid communication with said blend tank and said third tank, said at least one nozzle configured to apply the heated blended fluid and the third fluid to the surface of an aircraft.

29. The apparatus according to claim 28 wherein said first controller compares the composition of the blended fluid to the composition of the target fluid and advances the first and second fluids from said first and second tanks, respectively, into said blend tank to achieve and maintain the target fluid composition in said blend tank.

30. The apparatus according to claim 28, further comprising a purge valve connected to said blend tank and operating to purge the existing blended fluid from said blend tank, said first heater, said delivery device, and said second fluid pump, and replace the existing blended fluid contained therein with a blended fluid having a composition sufficient to prevent freezing thereof.

31. The apparatus according to claim 28 wherein said first pump advances said first fluid from said first tank through said blend tank, said first heater, said delivery device, and said second pump, and into said blend tank to replace the existing blended fluid contained therein with a blended fluid having a composition sufficient to prevent freezing thereof.

32. The apparatus according to claim 28 wherein the first fluid is a deicing fluid, the second fluid is water, and the third fluid is anti-icing fluid.

33. The apparatus according to claim 28 wherein the blended fluid is continuously circulated between said blend tank and said first heater, and said delivery device during operation to maintain a desired temperature of the heated blended fluid.

34. The apparatus according to claim 28 wherein the blended fluid is continuously circulated during operation between said blend tank, said first heater, and said delivery device such that the blended fluid remains homogeneous.

35. The apparatus according to claim 28, wherein said first, second, and third fluid pumps are positive displacement pumps.

36. The apparatus according to claim 28 wherein said first controller operates said first and second fluid pumps to control the rate of flow of each of the first and second fluids into said blend tank to achieve and maintain the target fluid composition.

37. The apparatus according to claim 28 wherein said first controller operates said third fluid pump to control the rate of flow of the third fluid to said extendible boom for application to the surface of an aircraft.

38. The apparatus according to claim 28 wherein one of said at least one nozzle is connected to a ground line extending from said apparatus, said one nozzle in fluid communication with said blend tank and said heater.

39. The apparatus according to claim 28 further comprising:
a first operator interface display panel positioned in a chassis cab of the vehicle, said first operator interface display panel in communication with said first controller; and
a second operator interface display panel positioned in an enclosed cab secured to said extendible boom, said second operator interface display panel in communication with said first controller.

40. The apparatus according to claim 28 further comprising a first analyzer in communication with said first temperature sensor and said first controller, said first analyzer for determining the target fluid composition based upon the ambient temperature of the environment and communicating the target fluid composition to said first controller.

41. The apparatus according to claim 28 further comprising:
a second heater positioned in said second tank for heating the second fluid during operation; and
a third heater positioned in said second tank for heating the second fluid when said apparatus is not operating;
wherein said second fluid is water.

42. The apparatus according to claim 28 further comprising a fourth fluid pump providing fluid communication between said blend tank and said first heater, said fourth fluid pump for circulating the blended fluid between said blend tank and said heater, said fourth fluid pump being a centrifugal pump.

43. The apparatus according to claim 28 further comprising a plurality of conduits providing fluid communication between and among said first tank, said second tank, said blend tank, said heater, and said delivery device.

44. The apparatus according to claim 28 further comprising a diffuser positioned in said blend tank, said diffuser providing fluid communication between said mixing manifold and said blend tank, said diffuser distributing the first and second fluids into said blend tank.

45. The apparatus according to claim 28 further comprising a second temperature sensor secured to said first heater, said second temperature sensor for identifying the temperature of the heated blended fluid exiting said first heater, said second temperature sensor communicating with said first heater controller such that said first heater controller operates said first heater to control the temperature of the heated blended fluid.

46. A method for applying a blended fluid to an aircraft comprising the steps of:
defining the composition of a target fluid;
mixing a first fluid from a first tank and a second fluid from a second tank in a blend tank to form a blended fluid;
measuring the composition and temperature of the blended fluid, the step comprising operating a temperature sensor secured substantially adjacent to a heater spaced apart from the blend tank;
manipulating the blended fluid to create a processed blended fluid having a composition substantially equivalent to the composition of the target fluid, the step comprising heating the blended fluid in the heater spaced apart from the blend tank to produce a processed heated blended fluid; and
applying the processed blended fluid to an aircraft.

47. The method according to claim 46 wherein the step of defining the composition a target fluid comprises the steps of:
measuring the ambient temperature of the environment; and
determining the composition of a fluid required to deice an aircraft based on the measured ambient temperature.

48. The method according to claim 47 wherein the step of determining the composition of a fluid required to deice an aircraft comprises incorporating a buffer range of temperature to determine the composition of a fluid required to deice an aircraft.

49. The method according to claim 46 wherein the step of measuring the composition of the blended fluid comprises operating a refractometer secured to the blend tank.

50. The method according to claim 46 wherein the step of manipulating the blended fluid comprises adjusting the composition of the blended fluid by incorporating additional fluid from one of the first or second tanks into the blend tank to achieve the target fluid composition.

51. The method according to claim 46 further comprising the step of directing the processed heated blended fluid into the blend tank prior to the step of applying the processed heated blended fluid to the aircraft.

52. The method according to claim 46 further comprising the step of comparing the measured composition of the blended heated fluid to the composition of the target fluid before the step of manipulating the blended fluid.

53. The method according to claim 46 further comprising the step of applying an anti-icing fluid from an anti-icing fluid tank to the aircraft after the step of applying the processed blended fluid to the aircraft.

54. The method according to claim 46 further comprising the step of purging the existing processed blended fluid from the blend tank, the heater, and a device for applying the processed heated blended fluid.

55. The method according to claim 54 wherein the step of purging comprises replacing the existing processed blended fluid present in the blend tank, the heater, and the device for applying the processed blended fluid with a blended fluid having a composition sufficient to prevent freezing thereof.

* * * * *